United States Patent
Kao et al.

(10) Patent No.: US 6,447,861 B1
(45) Date of Patent: Sep. 10, 2002

(54) FAERY ADHESIVE TAPE

(75) Inventors: Cheng-Kang Kao, Taipei; Wen-Hsien Chang, Shin-Tien; Ko-Hung Hsu, Taipei, all of (TW)

(73) Assignee: Four Pillars Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 09/552,581

(22) Filed: Apr. 19, 2000

(30) Foreign Application Priority Data

Nov. 25, 1999 (TW) ........................................ 88220093 U

(51) Int. Cl.⁷ ................................................ B32B 9/00
(52) U.S. Cl. .................... 428/40.1; 40/768; 40/773; 428/212; 428/219; 428/354; 428/355
(58) Field of Search .............................. 428/40.1, 42.1, 428/212, 219, 354, 355; 40/768, 773

(56) References Cited

U.S. PATENT DOCUMENTS 6,090,461 A * 7/2000 Frank ........................ 428/40.1

* cited by examiner

Primary Examiner—Nasser Ahmad
(74) Attorney, Agent, or Firm—Buchnam and Archer

(57) ABSTRACT

A faery adhesive tape is a transparent or translucent membrane substrate with constant width that is back-coated with glue, and multiple reels are produced and used as a tape. While producing multiple reels, the topic related describing intrigue is printed or tape-fitted at suitable interval on the substrate. The intrigue of said topic is expressed by segment with designs, letters, or excellent pictures and literary composition. Depending on the seriatim torn away of the adhesive tape, it will gradually deepen into the intrigue or gradually disclose the solution, build up the interesting effect of the expectation and pleasant surprise of users, and thus widen the scope of usage of the adhesive tape.

4 Claims, 4 Drawing Sheets

FAERY ADHESIVE TAPE

FIELD OF THE INVENTION

The present invention relates to a faery adhesive tape, particularly to a novel adhesive tape with pictures and articles for describing the topic intrigue. Depending on the seriatim torn away of the adhesive tape, it will gradually deepen into the intrigue or gradually disclose the solution, increase the interesting effect of usage, and thus widen the scope of usage of the adhesive tape.

BACKGROUND OF THE INVENTION

An adhesive tape has been used extensively and has become an indispensable item in our daily life. The traditional tapes can only be used as tapes, the invariable usage of which can not escape from a constrained frame. Today for the fast development in the industrial and commercial society, the more terse the pace of life become and the more nervous the people. The interactions between people become more drifted apart and more indifferent. The smile on the face and sense of humor has also gradually faded away. Therefore, if we can use the small stuffs that may be frequently touched in normal life to increase the interest and interactivity, it may become a good remedy for soothing the life pressure and regulating the spirit nervous. For example, it will make people feel very intimate while receiving the birthday greeting card with the sweet congratulation address printed on the seal tape of said card. Or/and as for the growing child, they always feel garrulous about the good words from parents' heart. If they use and touch the inscription on the adhesive tape often, it will have the encouraging effect and wisdom benefit with the passage of time. Therefore, it can combine the traditional functions of the adhesive tape with interest, and developing its scope of usage is the inventor's desire.

SUMMARY OF THE INVENTION

The main object of the present invention is to provide a faery adhesive tape. In order to achieve the above describing object, the present invention is a transparent or translucent membrane substrate with constant width that is back-coated with glue, and multiple reels are produced and used as tapes. And, the pictures and letters of said described intrigue of the shown topic is printed and tape-fitted at suitable interval on the substrate while producing multiple reels. Depending on the seriatim tearing away of the adhesive tape while using, it will gradually deepen into the intrigue or gradually disclose the solution.

According to the present invention, the topics can be generally classified, e.g., fairy tales, extracts of well-known sayings, wisdom beneficial riddle guess, interesting game, cartoon and caricature anthology, complimentary and praying address, anthology of precious words, anthology of joy, wise talks, the kinds of constellation fate and trend and etc. And, depending on different classification, it can develop different topics of subject matters. The type of performance can be designs, letters or excellent pictures and literary composition. The intrigue is guided in by segment. Under the situation that the user does not know the answer, the user has the expecting mentality. While they know the answers are in accordance with their thoughts, it will generate the amusement of surprise.

BRIEF DESCRIPTION OF THE DRAWINGS

The further substantial understanding of the aforementioned objects, features, and effects of the resent invention will be described more detailedly below with reference to the embodiments shown in the appended drawings.

DESCRIPTION OF THE PREFERRED EMBODIMENT

Firstly, refer to FIG. 1 through FIG. 7, a faery adhesive tape 1, 1' of the present invention is the same as a traditional adhesive tape. It is a transparent or translucent membrane substrate with constant width that is back-coated with glue, and multiple reels are produced and used as tapes. The difference between the present invention and the traditional one is that the topic 10, 10' related describing intrigue is printed at suitable interval on the substrate while producing multiple reels. The intrigue of said topic 10, 10' are able to be expressed by segment with designs, letters, or excellent pictures and literary composition to gradually guide them in. Depending on the usage of users and seriatim tearing away the adhesive tape simultaneously, it will gradually deepen into the intrigue, show different aspects or gradually disclose the solution.

According to the present invention, it can be generally classified and thus different subject matters of topics 10, 10' is developed, e.g., fairy tales, extracts of well-known sayings, wisdom beneficial riddle guess, interesting game, cartoon and caricature anthology, complimentary and praying address, anthology of precious words, anthology of joy, wise talks, constellation fate and trend and etc.

Figure 7:
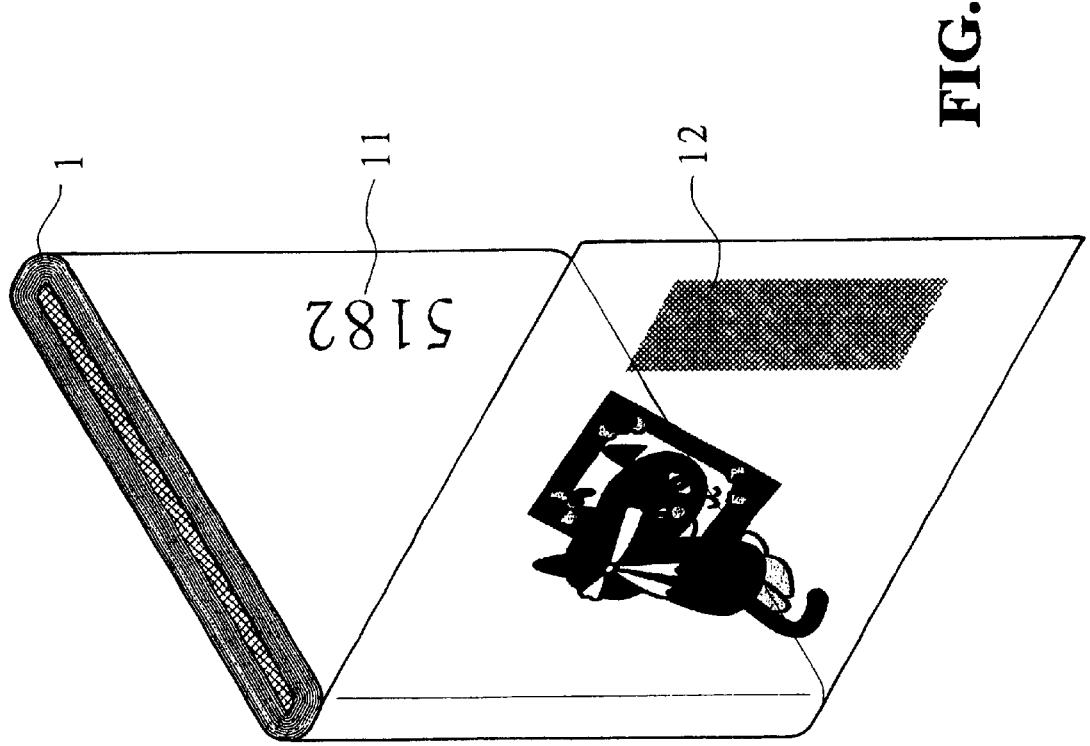
FIG. 7 is a schematic diagram of the present invention showing that it is shielded by the shielding materials at the solution location.

For example, the fairy tale can fit and combine with cartoon or caricature modeling design, then perform by segmental way; the extracts of well-known sayings of celebrities can be edited by art fonts to be become the apparent design. It will have the visual effects and also can be taped at the conspicuous location as a motto. The wisdom beneficial riddle guess as shown in FIG. 7 can print the answer to a riddle, solution or winning number 11 of the interesting game at some positions on the multiple reels of the adhesive tape 1, 1'. And it is shielded by the shielding material 12 at the corresponding locations of cover layers on it. Or it is processed by mosaic to blur the focal point to avoid the answers to be peeped in advance. An interesting game such as maze can fit with the composition of a narrow tortuous path and the layout of the path winding through high peak so as to design a game good for both old and young people. Cartoon and caricature anthology can fit the modeling characters of the cartoon and caricature with the comic motion to result in the interesting effect. Complimentary and praying address can extract congratulations and sweet intimate words of birthdays, joyous events or festivals, and use art fonts to edit them to become the apparent designs. Anthology of precious words and anthology of joy can fit the exaggerated modeling illustrations with jokes to result in the sidesplitting laughter effects. Wise talks such as the puns of new generation human beings can use art font to edit them to become the apparent designs. The constellation fate and trend are able to be shown by pictures and letters with different constellation diagrams fitting with the fate and trend at different time.

Figure 2:
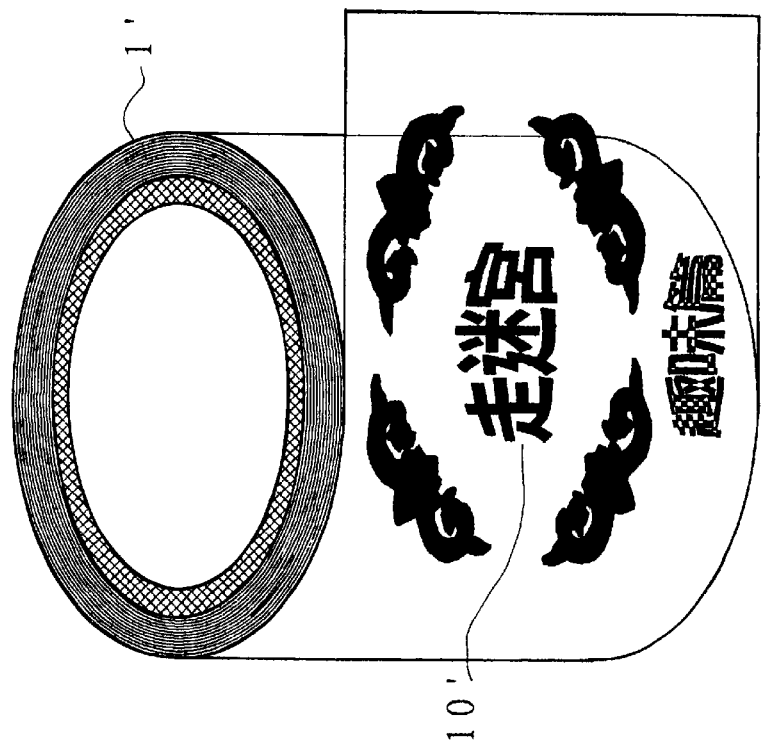
FIG. 2 is a perspective view showing another embodiment of the present invention shown with a topic.
Figure 1:
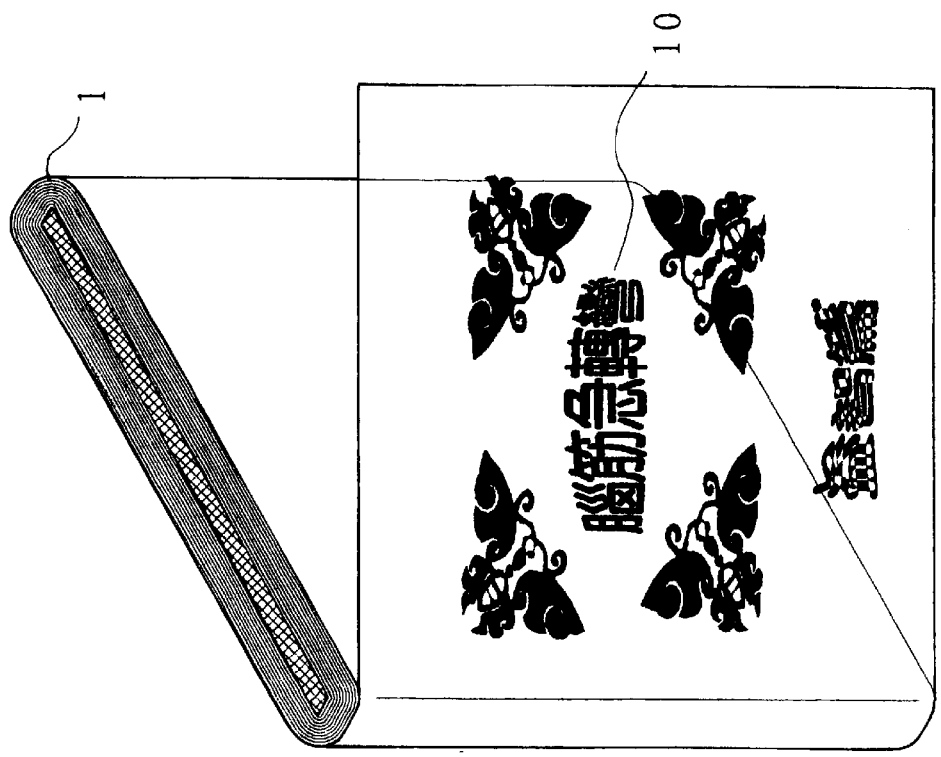
FIG. 1 is a perspective view showing a faery adhesive tape of an embodiment of the present invention shown with a topic.
Figure 3:
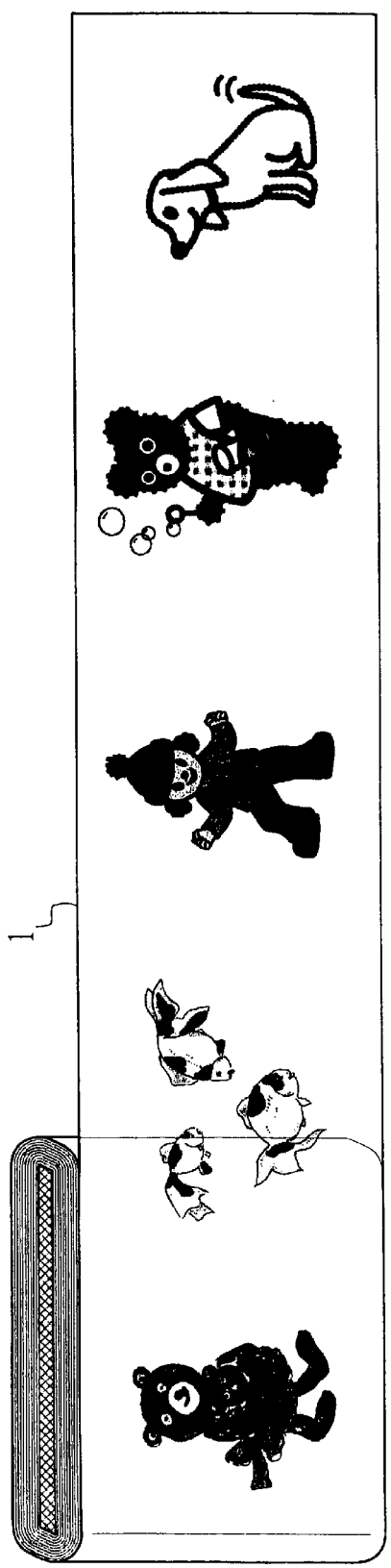
FIG. 3 is a developed schematic diagram of the embodiment of the present invention, wherein a printing with a topic design is shown.
Figure 4:
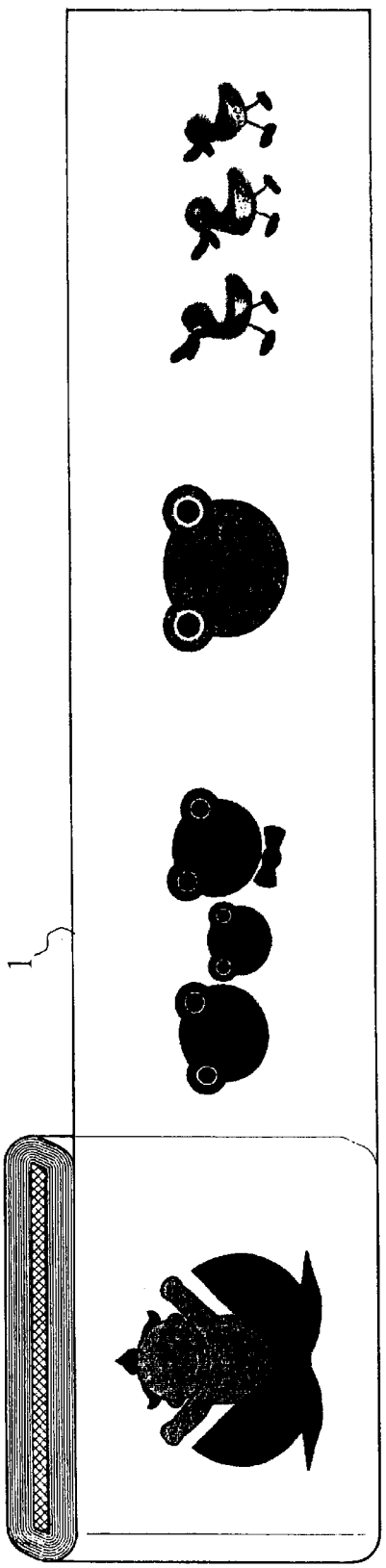
FIG. 4 is a developed schematic diagram of the embodiment of the present invention, wherein a printing with another topic design is shown.
Figure 5:
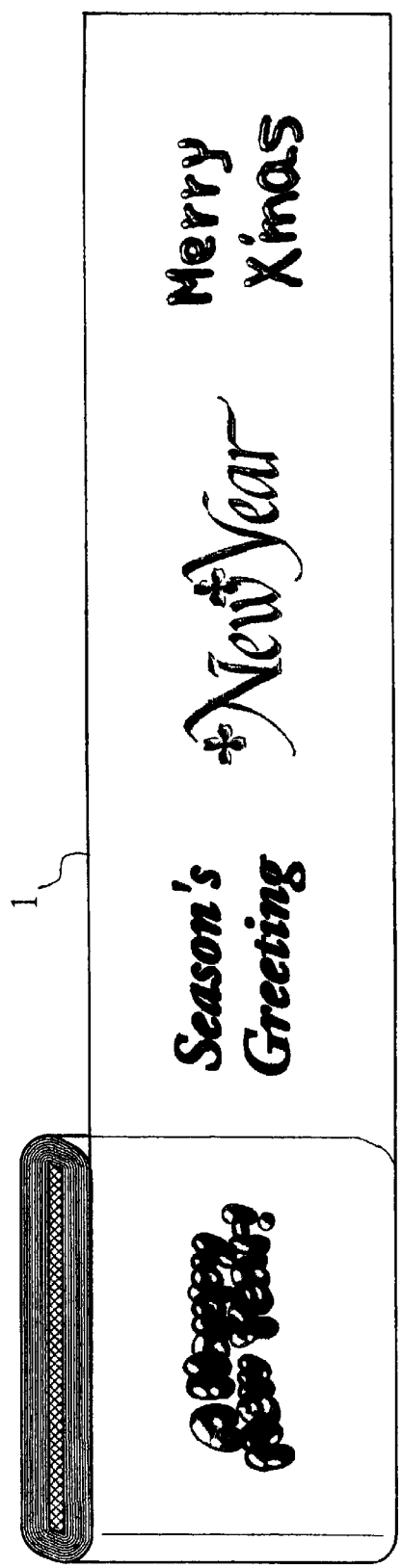
FIG. 5 is a developed schematic diagram of the embodiment of the present invention, wherein a printing with a further topic design is shown.
Figure 6:
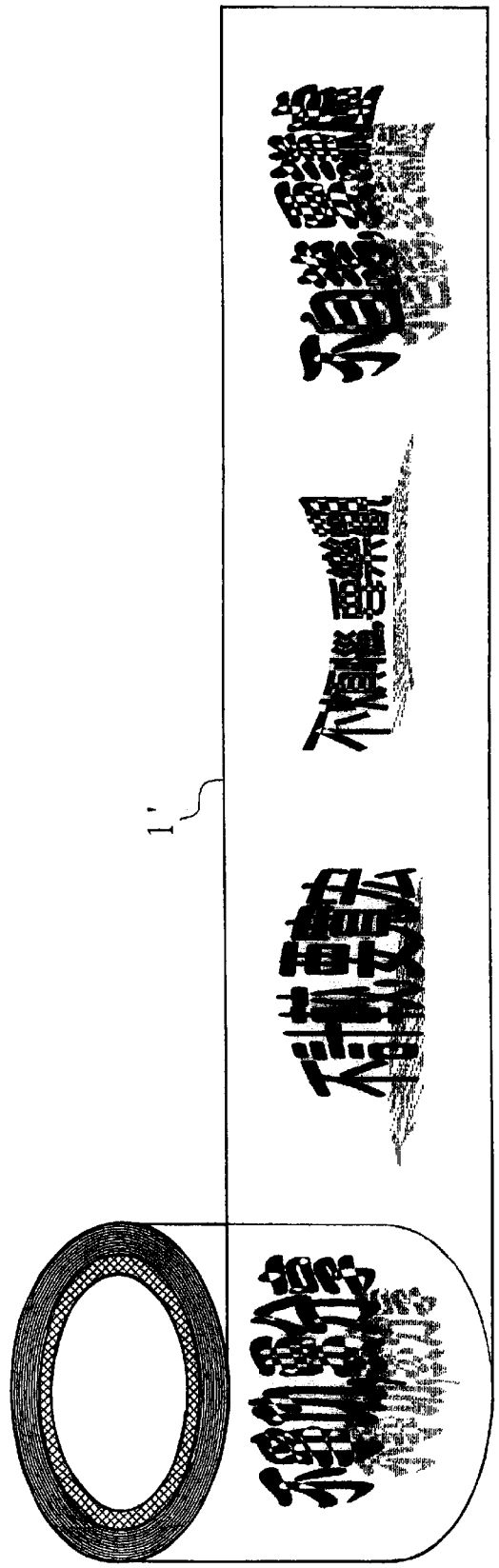
FIG. 6 is a developed schematic diagram of the embodiment of the present invention, wherein a printing with still a topic design is shown.

According to the present invention, the finish goods of the multiple reel of the adhesive tape 1, 1' can be made into a flat book type to be received easily in a pocket for carrying; or be made into a cylindrical or other non-circular shaped suitable shapes, and the topic is marked on the outside appearance of the finish good (as shown in FIGS. 1 and 2) for convenient selection of users. In addition, a content of the intrigue of said topic can be printed on the surface, back face or between the mezzanine. Or after the printing on the substrate of the adhesive tape with other transparent, translucent or light filtering membrane is finished, then locally tape-fitted on the substrate of the adhesive tape.

The aforementioned is merely a preferred embodiment of the present invention, and does not limit the applied scope of the present invention. That is, the equivalent variation and modification made without departing from the claims of the present invention shall still be within the scope of the present invention.

By summarizing the above described, the faery adhesive tape of the present invention has not only the tape function, but also the interesting effect of user's expectation and surprise. In addition, it widens the scope of usage of adhesive tapes. Thus, it is really a novel invention and rich of advantages.

What is claimed is:

1. A faery adhesive tape, comprising:

a) a transparent or translucent membrane substrate having a constant width and back coated with an adhesive, said membrane substrate being formed in multiple reels to be used as a tape;

b) an intriguing topic being printed segmentally on said membrane substrate including at least one answer, solution or winning number of the intriguing topic; and c) a shielding material covering said at least one answer, solution or winning number of the intriguing topic disposed at a corresponding location of a covering substrate reel layer.

2. A faery adhesive tape, comprising;

a) a transparent or translucent membrane substrate having a constant width and back coated with an adhesive, said membrane substrate being formed in multiple reels to be used as a tape;

b) an intriguing topic being printed segmentally on said membrane substrate including at least one answer, solution or winning number of the intriguing topic; and c) a mosaic processed at a corresponding location of a covering substrate reel layer to blur the focal point of the at least one answer, solution or winning number therebelow.

3. The faery adhesive tape as defined in claim 1, wherein the multiple reels are flat shaped or cylindrically shaped.

4. The faery adhesive tape as defined in claim 2, wherein the multiple reels are flat shaped or cylindrically shaped.

* * * * *